Figure 1:
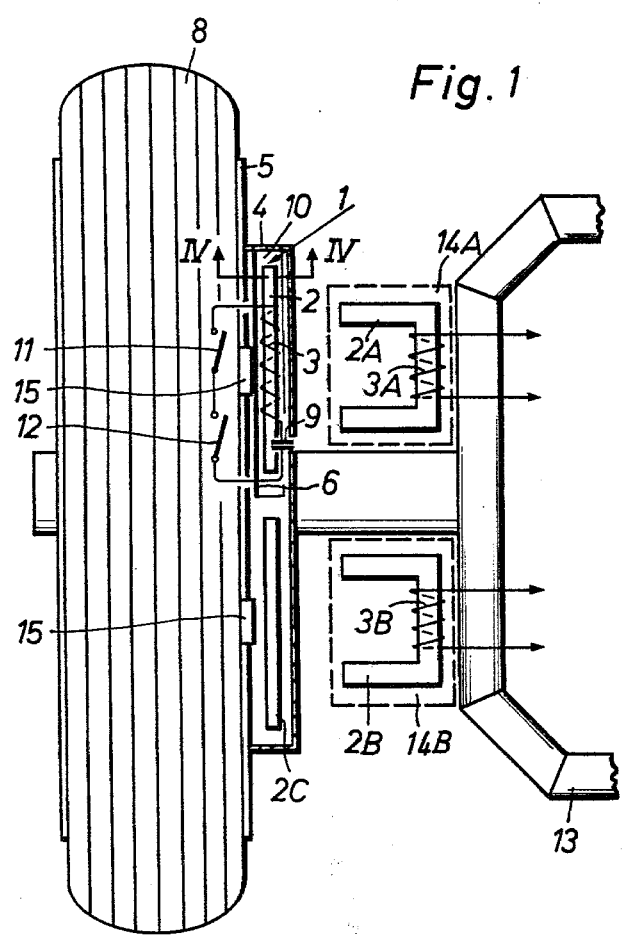

United States Patent [19]

Fritze

[11] 4,340,890
[45] Jul. 20, 1982

[54] ARRANGEMENT FOR TELEMETRICALLY MONITORING MOVING MACHINE PARTS

[76] Inventor: Kurt Fritze, Dibberser Mühlenweg 91b, 2110 Buchholz, Nordheide, Fed. Rep. of Germany

[21] Appl. No.: 184,636

[22] Filed: Sep. 8, 1980

[30] Foreign Application Priority Data

Sep. 6, 1979 [DE] Fed. Rep. of Germany ....... 2935965

[51] Int. Cl.³ ............................................ G08C 19/08
[52] U.S. Cl. ......................... 340/870.32; 340/870.31; 340/870.37
[58] Field of Search ...................... 340/870.31, 870.32, 340/870.37

[56] References Cited

U.S. PATENT DOCUMENTS

| | | | |
|---|---|---|---|
| 3,303,701 | 2/1967 | Matsuura et al. | 340/870.37 |
| 3,471,844 | 10/1969 | Schugt | 340/870.32 |
| 4,150,358 | 4/1979 | Aviander | 340/870.31 |

FOREIGN PATENT DOCUMENTS 2523488 4/1977 Fed. Rep. of Germany ...................... 340/870.32

Primary Examiner—Gerald L. Brigance
Attorney, Agent, or Firm—Cooper, Dunham, Clark, Griffin & Moran

[57] ABSTRACT

A device for telemetrically monitoring moving machine parts, particularly rotating vehicle wheels, by means of a stationary transmitter and receiver assembly comprising output and input coils shielded from one another which are inductively coupled periodically by means of a coupling coil mounted on said moving machine part or rotating vehicle wheel, in which the coupling coil (2) is surrounded by a highly conductive shielding (6) which is provided with an aperture (7) only in its front side facing towards said transmitter and forming an angle ($\alpha$) in the shielding (6) of 10 to 60 degrees, preferably of 20 to 40 degrees, with the center axis of the coupling coil (2).

7 Claims, 2 Drawing Figures

ARRANGEMENT FOR TELEMETRICALLY MONITORING MOVING MACHINE PARTS

This invention relates to an arrangement for telemetrically monitoring moving machine parts, particularly rotating vehicle wheels, by means of a transmitter and receiver assembly stationary with respect thereto, said transmitter and receiver being shielded from each other and being provided with output and input coils which are periodically connected in a function-governing manner by means of a coupling coil mounted on said moving machine parts or rotating vehicle wheels, respectively, via a transducer means also mounted thereon.

Arrangements of this type have been known e.g. from the German Patent Specification No. 1,505,880 and the DE-OS No. 2,523,488 (=Laid-open Application). In the arrangement known from the DE-OS No. 2,523,488 for electronically monitoring the condition of vehicle tires and wheels, there are provided on the stationary vehicle body adjacent the inner sides of the wheel two coils in relatively narrow spaced relationship including cores of ferromagnetic material and being electrically shielded from each other; these coils each form the inductive antenna for a transmitter and a receiver, respectively, and are tuned to a common frequency. By means of a certain spatial relationship and shielding from each other, said coils are isolated from one another and are periodically coupled to each other on account of the rotation of the wheels via a third, coupling coil tuned to the same frequency and mounted on the wheel or the rim bead. It is a disadvantage of such an arrangement that the damping and the resonant frequency of the oscillating circuit are greatly increased by iron parts provided in the vicinity. Thereby the coupling conditions between the output oscillating circuit of the transmitter and the input oscillating circuit of the receiver are influenced undesirably.

It is the object of the present invention to eliminate this disadvantage and to provide a transmission system in which, in conjunction with the arrangement for telemetrically monitoring moving machine parts, any environmental influences on the damping and the resonant frequency are practically eliminated and at the same time an additional coupling intensification can be achieved.

In accordance with the patent claim 1 this object is achieved in that the coupling coil is surrounded by a highly conductive shielding which is provided with an aperture only in its front side facing towards the transmitter and receiver assembly, said aperture permitting exiting of the magnetic flux lines, so that when the coupling coil passes the transmitter and receiver assembly said aperture will face over its full length the transmitter and receiver assembly.

Thus, the back of the coupling coil is shielded a highly conductive material, preferably strong sheet copper, so that stray flux lines cannot reach the iron material. Thereby any influence of this material on the resonant frequency and the damping will be prevented. This effect may be enhanced with decreasing size of the aperture in the shielding and with increasing extension of the shielding beyond the coupling coil ends. On the other hand, however, the shielding must not excessively impede the exit of those flux lines required for the desired coupling to the transmitter output circuit and, respectively, the receiver input circuit.

The present invention therefore provides that the aperture in the shielding forms an angle of 10 to 60 degrees, preferably of 20 to 40 degrees, with the centre axis of the coupling coil. Moreover, the shielding should extend beyond either end of the coil by about 10% of the coil length, but at least by about 10 mm. By shielding the stray field of the coils as provided in the invention, an additional advantage which is of importance for the operation of the entire system is obtained, viz., that the magnetic flux lines are highly focused in the direction of the transmitter-receiver oscillating circuit, whereby the coupling is intensified. This applies particularly when an arcuate ferrite core is used instead of a cylindrical one for the coupling coil. The former may even be a U-shaped core, wherein the ends of such a ferrite core may slightly protrude from the gap in the shielding towards the transmitter and, respectively, the receiver coils, which may also be U-shaped.

Surprisingly, the structure of the coupling coil in accordance with the present invention also results in an especially favourable directionality, which is due to an appropriate field deformation by the eddy currents flowing in the rear portion of the shielding and the magnetic flux lines resulting therefrom.

No matter how favourable the design of the shielding, there will always be some slight damping and variation of inductance, which will, however, not vary greatly when the shielding is attached to an iron structure and can therefore be test-shop compensated; this is of particular advantage with a view to later replacement at the site. In case of repairs a replacement can therefore be effected even by unskilled persons, and the complicated frequency tuning will be unnecessary.

The preferred material for the shielding is copper, though other highly conductive materials are suitable as well. When the shielding of strong sheet copper is mounted on a wheel rim this will naturally result in a wheel imbalance that will have to be compensated especially at higher speeds of revolution of the wheels. In order to reduce this imbalance, a material of similar electrical resistance but reduced mass may be used. Materials suitable for this purpose are e.g. silver sheet, which may be thinner and yet have the same electrical resistance, or aluminium sheet, which has a considerably lower specific gravity than either of the two aforementioned materials.

The highly conductive material may be used either in the form of sheet metal or of a possibly laminated foil or even of wire cloth to form the shielding.

Figure 2:
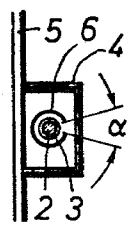

Further details and advantages of the present invention will become apparent from the embodiment shown in the accompanying drawing, in which:

FIG. 1 is a longitudinal sectional view through an assembly in accordance with the present invention, and FIG. 2 is a cross-sectional view along the line IV—IV through the assembly shown in FIG. 1.

The embodiment of the invention shown in FIG. 1 employs the arrangement in accordance with the invention for the electronic monitoring of the condition of vehicle tires and wheels as described in detail in the aforementioned DE-OS No. 2,523,488. The coupling coil 1 is attached to the inside of the rim 5 of a vehicle wheel 8 having a rubber tire; the coupling coil 1 comprises a ferrite rod 2 about which a coil 3 is wound to which an oscillating circuit capacitor 9 is connected. A further ferrite rod 2C is disposed in the lower portion of the coupling coil. All of these elements are embedded, e.g. in foamed material 10, in a casing 4 of non-conductive and non-magnetic material. The casing 4 is attached by cramps 15 to the inside of the rim 5. In case of trouble, e.g. when the temperature of the wheel or the brake drum is excessively high, the oscillating circuit 3, 9 will be opened by a valve switch 11 or a thermoswitch 12. In that case the oscillating circuit will be ineffective and the transmitter and receiver coils will be decoupled. Two metallic cup members 14A and 14B are mounted in spaced relationship on the vehicle chassis 13. The transmitter, which comprises the U-shaped ferrite core 2A and the coil 3A, is disposed in shielded relationship in the cup member 14A, while the receiver, which comprises the U-shaped ferrite core 2B and the coil 3B, is disposed within the cup member 14B. The cup member 14B together with the coil 3B is turned at an angle to the coil 3A such that any stray energy still effective from the transmitter will result in a minimum voltage in the coil 3B. In accordance with the present invention the coupling coil 1 is surrounded by a shielding 6 made of sheet copper, in which an aperture 7 with an aperture angle $\alpha$ is left. The aperture 7 of the shielding 6 is disposed such that, when the casing 4 passes the transmitter and receiver assembly, it will face said assembly and be parallel thereto.

When the oscillating circuit coupling coil mounted on the vehicle wheel 8 has the position shown in FIG. 1, the U-shaped cores 2A and 2B will only be coupled via said coupling coil when the switches 11 and 12 are closed, whereby upon each revolution of the wheel high-frequency energy will momentarily be transmitted from the transmitter antenna 3A to the receiver antenna 3B.

What is claimed is:

1. In an apparatus for telemetrically monitoring a moving machine part, particularly a rotating vehicle wheel, by means of a transmitter and receiver assembly stationary with respect to said moving part, said transmitter and receiver being spaced from and electrically shielded from one another and provided with output and input coils which are inductively coupled periodically by a coupling means mounted on said moving machine part or rotating vehicle wheel, respectively, via an induction coupling means (1) also mounted thereon, the improvement characterized in that said coupling coil (3) is sourrounded by an electrically conductive shielding means (6) provided with an aperture (7) only in its front side facing toward said transmitter and receiver assembly, said aperture (7) in the shielding means (6) forming an angle ($\alpha$) of 10° to 60° with respect to the centre axis of the coupling coil (3).

2. An apparatus as defined in claim 1, wherein said shielding means (6) projects beyond the ends of said coupling coil (1).

3. An apparatus as defined in claim 1 wherein said angle ($\alpha$) is in the range of 20° to 40°.

4. In an apparatus for telemetrically monitoring moving machine parts, particularly rotating vehicle wheels, by means of a transmitter and receiver assembly stationary with respect to said moving part, said transmitter and receiver being spaced from and electrically shielded from one another and provided with output and input coils which are inductively coupled periodically by an induction coupling means mounted on said moving machine part, said coupling means comprising an inductance coupling coil (3) having a ferrite core (2) and an axially aligned spaced ferrite rod inductance coupling (2C) wherein said inductance coil (3) and said inductance coupler (2C) are periodically brought into alignment with the magnetic fields of said transmitter and receiver respectively by movement of said machine part, the improvement which comprises surrounding said inductance coupling coil (3) with an electrically conductive shielding means (6) provided with an aperture (7) only in its front side facing toward said transmitter, said aperture (7) in the shielding means (6) forming an angle ($\alpha$) of 10° to 60° with respect to the centre axis of the coupling coil (3).

5. An apparatus as defined in claim 4 wherein said angle ($\alpha$) is in the range of 20° to 40°.

6. An apparatus as defined in claim 4 wherein said transmitter comprises a coil (3A) and a U-shaped ferrite core (2A) and wherein the poles of said transmitter core (2A) are periodically brought into alignment with the axis of said coupling coil (3) by movement of said machine part.

7. An apparatus as defined in claim 6 wherein said aperature (7) in said shielding means (6) permits coupling between said transmitter and said receiver only when the poles of said transmitter core (2A) are in alignment with the axis of the core (2) of said inductance coupling coil (3).

* * * * *